Dec. 10, 1929.  C. A. PARSONS  1,739,415
SURFACE CONDENSER
Filed Feb. 10, 1928   2 Sheets-Sheet 1

Inventor
Charles Algernon Parsons
By Spear, Middleton, Donaldson & Hale
Attys

Dec. 10, 1929.  C. A. PARSONS  1,739,415
SURFACE CONDENSER
Filed Feb. 10, 1928    2 Sheets-Sheet 2

Patented Dec. 10, 1929

1,739,415

UNITED STATES PATENT OFFICE

CHARLES ALGERNON PARSONS, OF NEWCASTLE-ON-TYNE, ENGLAND

SURFACE CONDENSER

Application filed February 10, 1928, Serial No. 253,478, and in Great Britain March 18, 1927.

This invention relates to surface condensers and has for its main object to reduce or prevent the erosion of the tubes which has been found by experiment to be due to turbulence and vortex motion of the water entering them.

With such an object, the invention consists in a surface condenser having the characteristic features hereinafter described and particularly pointed out in the claims.

The invention also consists in the improved condensers to be hereinafter described or indicated.

Referring to the accompanying drawings, which are of a diagrammatic nature:—

Figure 1:
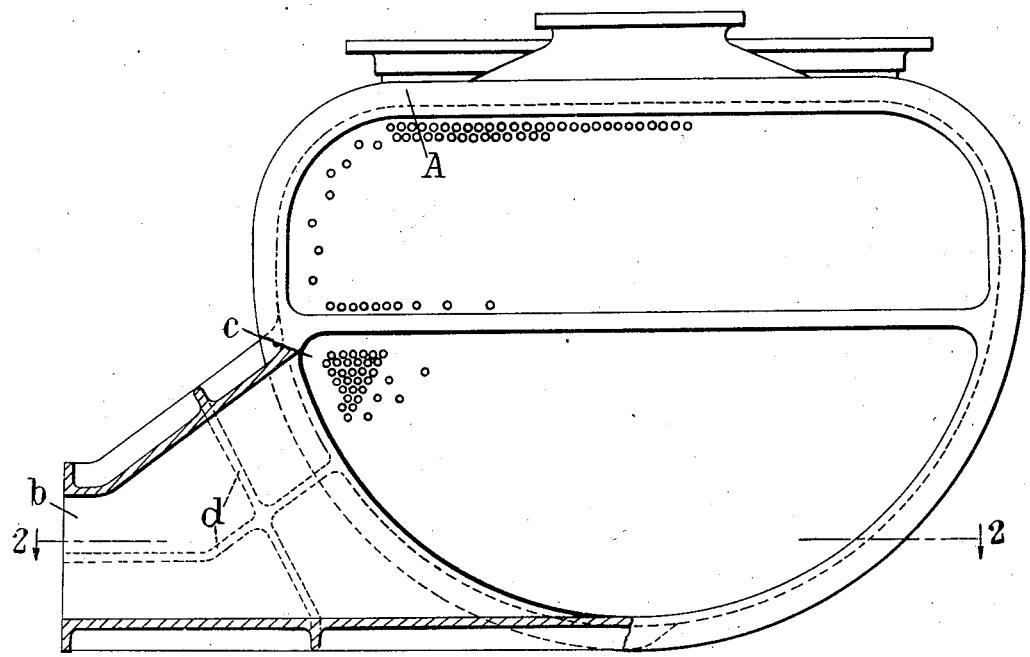
Figure 1 shows an end view partly in section of one form of condenser according to the present invention, Figure 2 being a cross-section on the line 2—2 of Figure 1.
Figure 2:
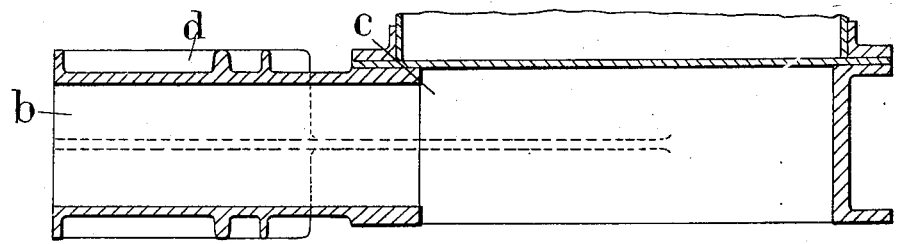

In carrying the invention into effect according to one form as shown in Figure 1 and 2 applied by way of example to a double-flow condenser, A, the water inlet duct, b, through which the circulating water enters is provided with an increasing cross-sectional area to form an expansion or enlargement, preferably stream-line in form, which becomes very large just before its junction with the water-box, c, i. e., attains a size comparable with that of the water-box at the point of junction therewith. In the particular form shown, the water inlet duct, b, increases in depth, (see Figure 1) but is of constant breadth, (see Figure 2) the cross-section changing for example from a circle to a rectangle; in addition it is provided with strengthening ribs, d, d. This expansion or enlargement reduces the velocity of flow of the water to a minimum before it enters the box, thus providing a body of water in a state of comparative quiescence without turbulence or vortex motion, from which the condenser tubes are fed.

The actual shape of the enlargement or expansion just before its junction with the water-box may, however, be of any other convenient form, the water-box being shaped to suit the water inlet.

Strainers, baffles or other well-known means may be provided in the enlargement of the water inlet duct or in the junction of the pipe and the water-box to increase uniformity of flow and annual turbulence in the water before entry into the water-box.

Figure 3:
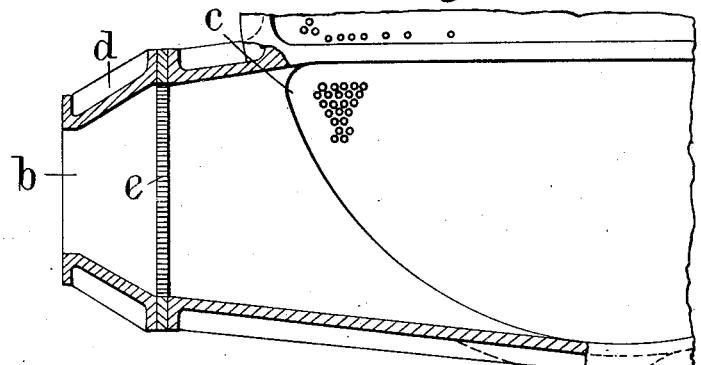
Figure 3 is a view corresponding to Figure 1 in which a screen is arranged in the water inlet duct.

Thus in Figure 3, a strainer or screen, e, is shown extending transversely across the water inlet; more than one such screen may be used if desired.

Figure 4:
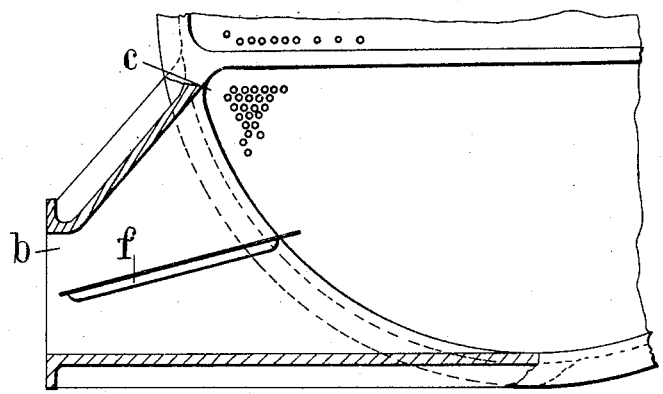
Figures 4 and 5 are similar views showing baffles inserted in the inlet; while finally
Figure 5:
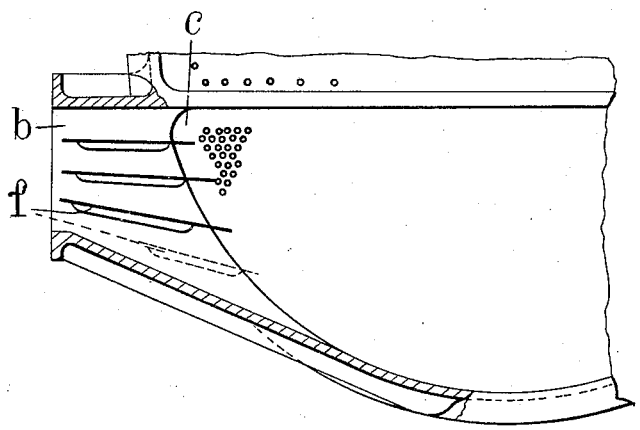
Figure 6:
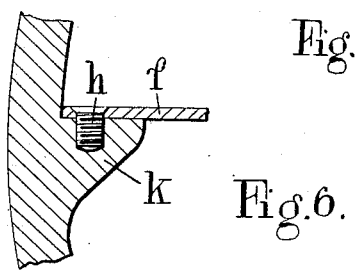
Figure 6 is a detail view to a larger scale showing a method of attaching a baffle to the inlet wall.

Again in Figures 4 and 5, baffles, f, f, are shown running in a more or less longitudinal direction through the water inlet duct, to assist in directing the water in streams to the appropriate part, either a single baffle being fitted as in Figure 4 or a plurality of diverging baffles as in Figure 5; such baffles, as desired, may or may not project into the water-box. As seen in Figure 6, the baffles are fitted in place by means of countersunk screw pins, such as h, securing them to shelves, k, cast on to the walls of the inlet duct, but angles or other convenient forms of attachment may be used as desired.

From experiments made it is found that the turbulence and velocity of the vortices produced by the flow of water in the water-boxes of ordinary condensers are functions of the velocity of the entering water. In certain cases the cavitation caused by these travelling vortices entering the tubes and blocking them has been so great that the flow of water through the tubes has been reduced to one-fifth of its normal amount. By reducing the velocity and turbulence of the flow of water in the water-box according to my invention, all turbulence and vortex motion in the tubes is practically eliminated or very materially lessened and hence erosion of the tubes is reduced to a minimum.

The invention is broad enough in scope to cover any means of reducing the velocity and turbulence of flow of the circulating water before it enters the water-box of the condenser.

Having now described my invention, what I claim as new and desire to secure by Letters Patent is:—

1. A surface condenser having a water-box, and means for reducing the velocity and turbulence of the circulating water immediately before its entry thereinto.

2. A surface condenser having a water-box and a divergent circulating-water inlet duct connected thereto, said duct increasing in cross-sectional area in a direction towards said water-box until comparable in size with the corresponding dimensions thereof at the point of junction.

3. A surface condenser as claimed in claim 2, having flow-directing means disposed in said divergent inlet duct.

4. A surface condenser as claimed in claim 2, having a plurality of baffles disposed in said divergent inlet duct, said baffles mutually diverging in correspondence therewith.

In testimony whereof I have signed my name to this specification.

CHARLES ALGERNON PARSONS.